United States Patent [19]
Rawlings et al.

[11] Patent Number: 5,322,337
[45] Date of Patent: Jun. 21, 1994

[54] CONVERTIBLE BOOT

[75] Inventors: Stephen P. Rawlings, Onsted; Steven J. Skornicka, Tecumseh, both of Mich.

[73] Assignee: Wickes Manufacturing Company, Charlotte, N.C.

[21] Appl. No.: 16,567

[22] Filed: Feb. 11, 1993

[51] Int. Cl.5 .................................................. B60J 7/20
[52] U.S. Cl. ........................................ 296/136; 296/100
[58] Field of Search ................................. 296/136, 100

[56] References Cited

U.S. PATENT DOCUMENTS

| | | | |
|---|---|---|---|
| 2,664,309 | 12/1953 | Kavalar | 296/136 |
| 3,237,982 | 3/1966 | Bell et al. | 296/136 |
| 3,332,717 | 7/1967 | Amesbury | 296/136 |
| 3,510,165 | 5/1970 | Adams | 296/136 |
| 4,930,833 | 6/1990 | Cichoski et al. | 296/136 |
| 4,998,766 | 3/1991 | Biermacher et al. | 296/136 |

*Primary Examiner*—Joseph D. Pape
*Attorney, Agent, or Firm*—David A. Greenlee

[57] ABSTRACT

A convertible vehicle includes a U-shaped top storage well having rear and side edges that are defined by body sheet metal, a front edge defined by the vehicle rear seat, and forwardly-projecting side quarter portions having a front and spaced side walls. A boot for covering the stored top comprises a semi-rigid laminate of vinyl and foam layers having a smooth top surface. The bottom surface has two longitudinal grooves enabling folding for storage. The periphery of the rear surface has spaced indentations between the grooves for locating and mounting peripheral C-shaped clips which grip the well rear and side edges, and quarter side and front walls. A tongue is mounted on the boot front edge and includes a latch bead. The tongue is inserted into the slot of a receiver mounted on the rear seat back. The receiver comprises a base having a recess for receiving the latch bead and an opposing flexible wall which clamps the tongue to latch the bead into the recess. The tongue has a handle to facilitate boot installation. The boot is slightly larger laterally and longitudinally than the well opening to place the boot in compression to assist boot retention and to accommodate vehicle build variations. The boot is readily manually-installed and -removed in a matter of mere seconds.

27 Claims, 4 Drawing Sheets

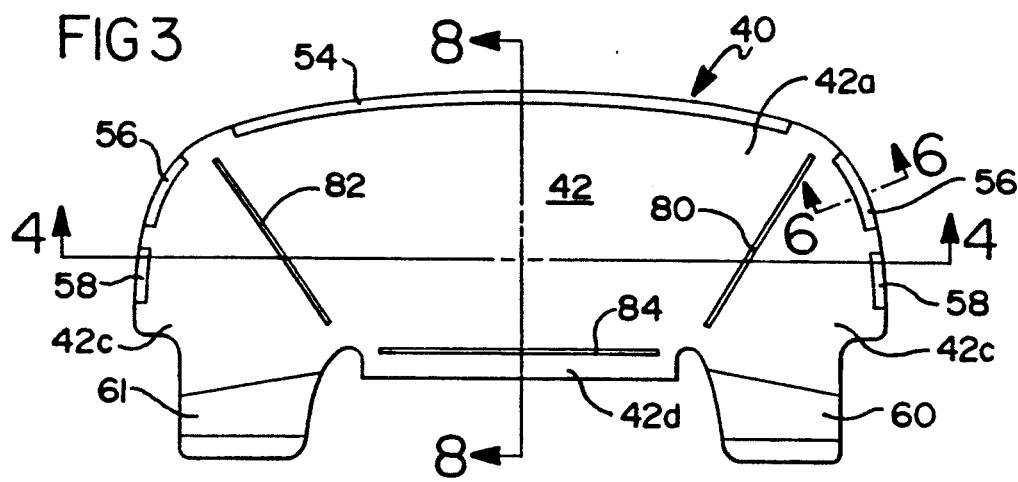
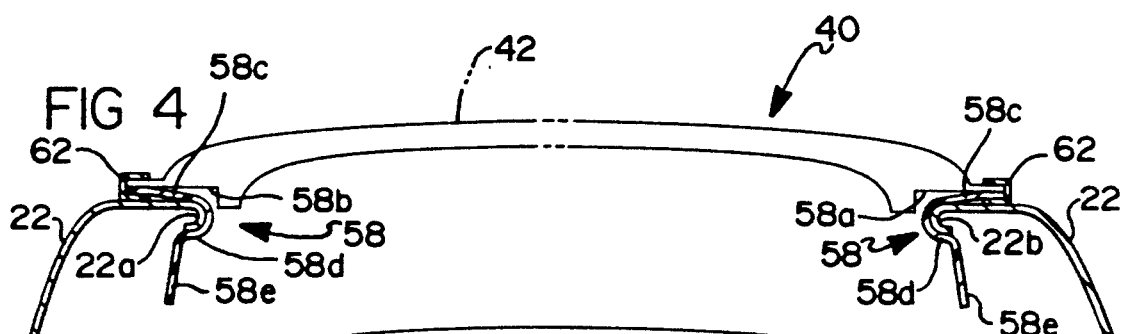
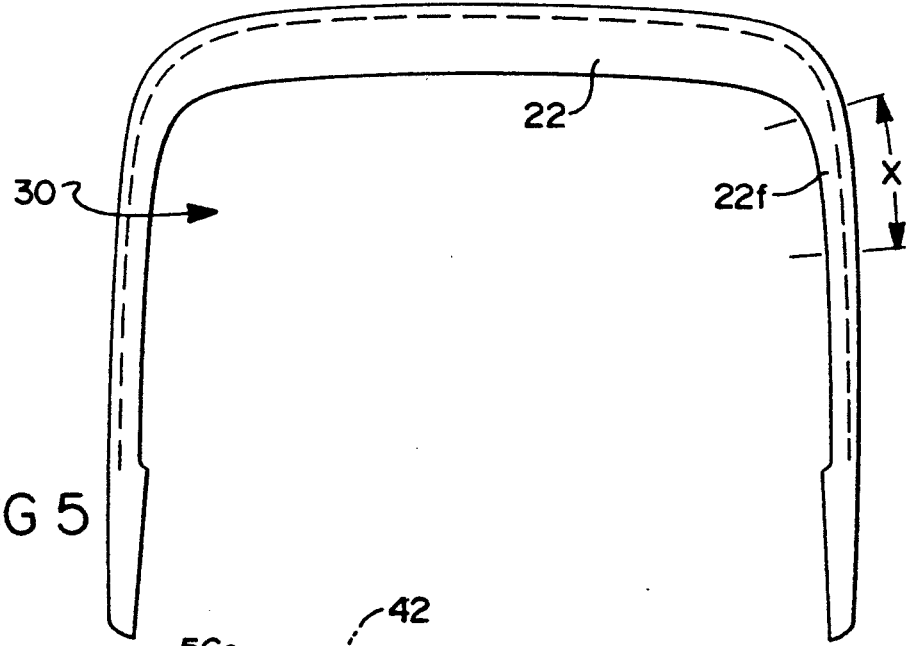
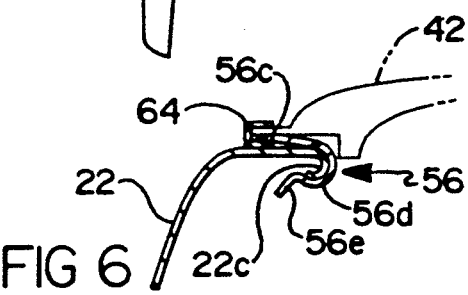
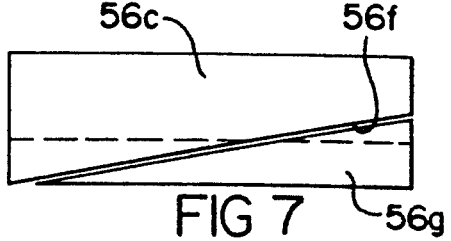

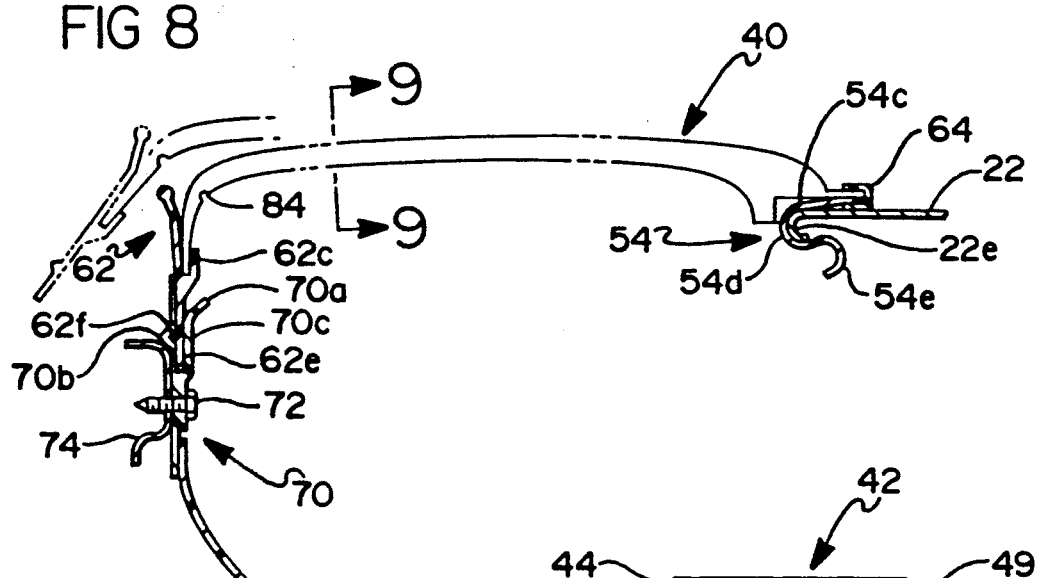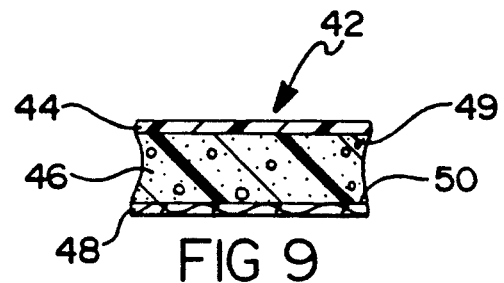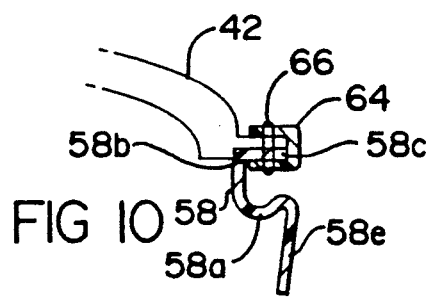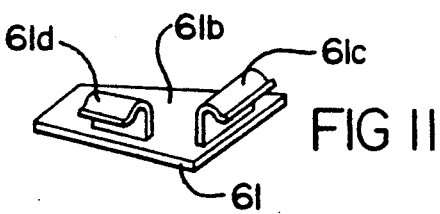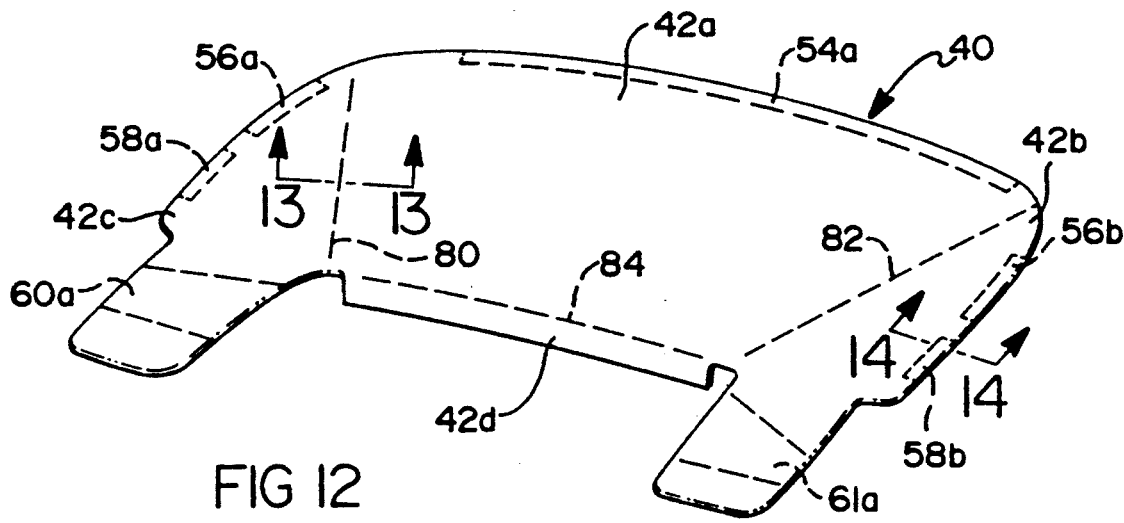

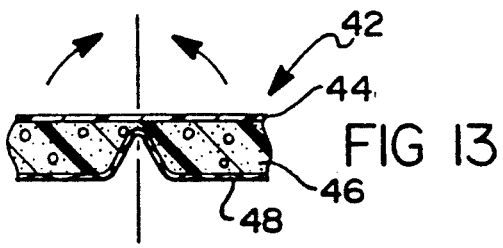
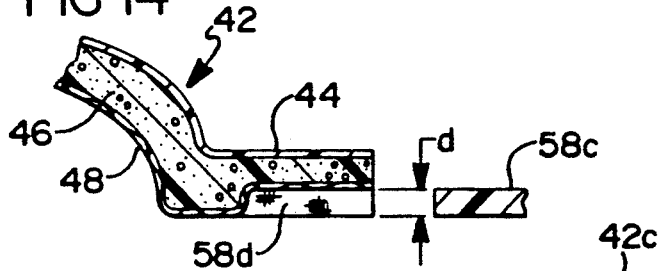
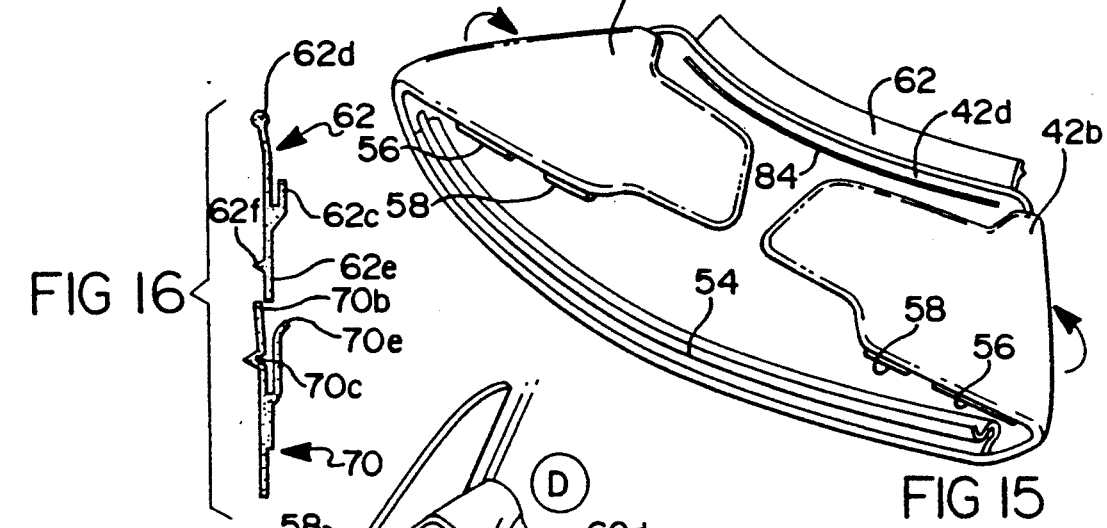
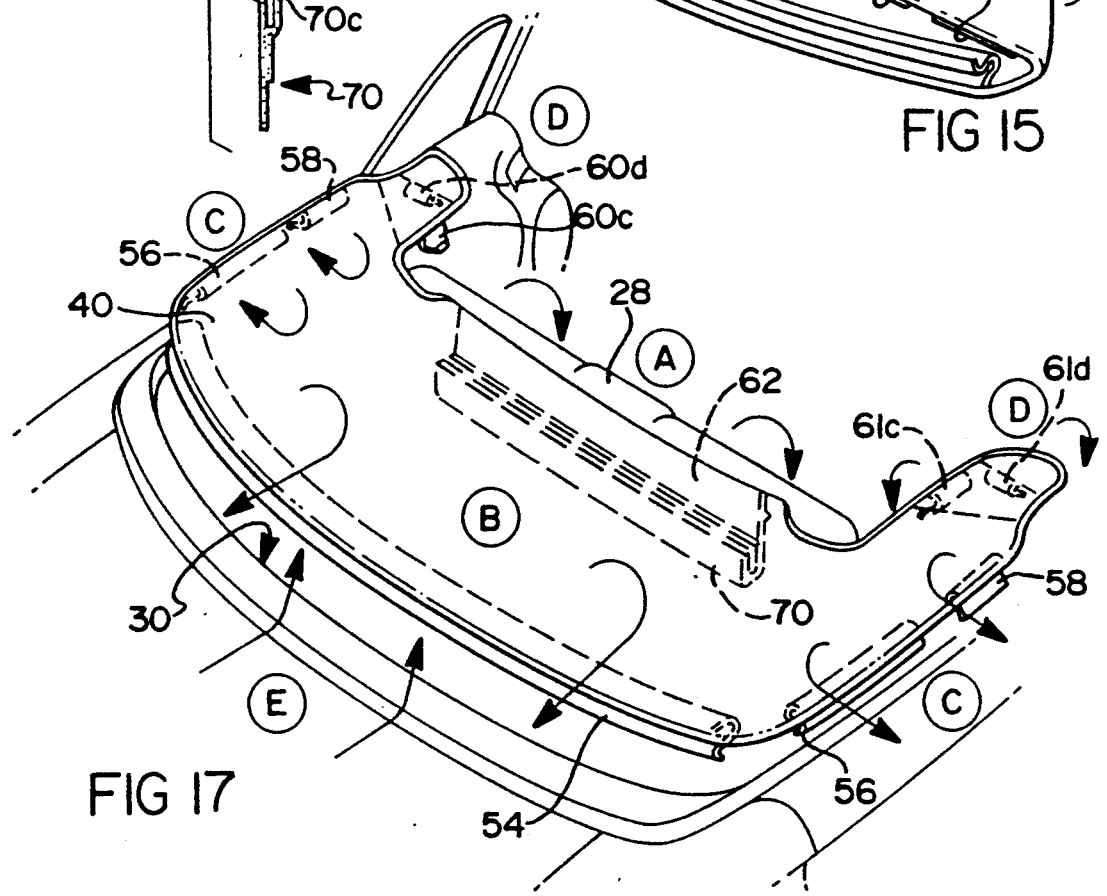

CONVERTIBLE BOOT

BACKGROUND OF THE INVENTION

This invention relates generally to convertible vehicles and, more particularly, to a boot for covering a lowered convertible top in a storage well.

Convertible tops are conventionally stored in a storage well when lowered. Some vehicles utilize a convertible top storage arrangement in which only a portion of the top is located in the storage well when lowered, while the remainder projects out of the well above the vehicle exterior sheet metal. This protrusion of a portion of the top is aesthetically undesirable, since it interrupts the exterior styling lines of the vehicle. It is aesthetically more desirable to store the entire top completely within the well when lowered. This enables maintenance of the exterior styling lines of the vehicle when the top is lowered.

Convertibles utilize a boot to cover the lowered top, whether it is only partially or completely located in the well. This boot usually takes the form of a soft vinyl and foam laminated cover that is attached to the vehicle body surrounding the storage well by snaps, or hook-and-loop fasteners (e.g. "Velcro" brand fasteners), or a combination thereof. They are normally compactly folded to utilize minimal space when stored.

In the case of a boot which covers a top stored completely (or substantially completely) in the well, these soft boots are usually stretched somewhat to provide a smooth appearance in conformance with the vehicle exterior styling lines when installed. This stretching complicates boot installation, especially in cooler weather which stiffens the boot material. Sunlight and high ambient temperatures also tend to soften the boot material which then sags into the well, which detracts from the desired aesthetic appearance.

Some convertibles utilize hard covers which are attached by snaps or other fasteners. These hard boots are easier to install, but are difficult to store, even if they fold in half, because of their shape and rigidity. Also, since these boots are rigid, they do not easily accommodate dimensional differences in well openings caused by dimensional "growth" or "shrinkage" of the well due to vehicle build tolerances.

The currently available boots are secured to the vehicle body by some snaps, clips, hook-and-loop fasteners or some combination thereof. These boots do not install easily or quickly and often require two people to install.

It would be desirable to provide a boot which presents a smooth appearance despite the ambient temperature, yet which utilizes minimal space when stored, thus combining the features of both soft and hard boots.

It would also be desirable to provide a boot which readily accommodates vehicle build dimensional variations without affecting the appearance of the boot when installed.

It would further be desirable to provide a boot which can be readily and quickly manually installed and removed by one person.

SUMMARY OF THE INVENTION

It is therefore an object of this invention to provide a boot which presents a smooth appearance despite the ambient temperature, yet which utilizes minimal space when stored, thus combining the features of both soft and hard boots.

Another object of this invention is to provide a boot which readily accommodates vehicle build dimensional variations without affecting the appearance of the boot when installed.

A further object of this invention is to provide a boot which can be readily and quickly manually installed and removed by one person.

In one aspect, this invention features a boot for covering a vehicle storage well which has an opening defined by front, rear and side edges to conceal a convertible top stored therein. The boot is a semi-rigid laminate of vinyl and foam layers having a vinyl top layer shaped to cover the well opening when installed. It has a smooth top surface and a plurality of grooves in its bottom surface dividing the boot laterally into a plurality of segments to facilitate folding of the boot along the grooves into a compact form for storage. A plurality of fasteners are secured about the boot periphery for engagement with the well edges to install the boot.

Preferably, the plurality of the fasteners comprise clips which each engage and embrace the well side and rear edges and a latch device for fastening the front edge of the boot to the well wall. The latch device includes a handle for operating the latch to facilitate installation of the boot.

In another aspect, this invention features a boot having a lateral dimension slightly wider than the lateral spacing of the well side edges and a longitudinal dimension slightly larger than the longitudinal spacing of the well front and rear edges and the latch device has sufficient rigidity to place the boot in lateral and longitudinal compression when installed.

In a further aspect, this invention features a laminated boot having the thickness of the laminate reduced at spaced locations on the boot bottom surface about its periphery providing indentations for locating and mounting the fasteners. The side and rear edge fasteners comprise clips having a mounting portion and a flexible finger for clampingly engaging the well side and rear edges to the mounting portion. The combined thickness of the laminate at the indentation and the clip mounting portion is the same as the thickness of the adjacent laminate to provide thickness continuity about the boot periphery.

Preferably, the latch device comprises a tongue mounting the handle at one end and a protruding latch bead at the other end, and a latch receiver mounted on the well wall and including a slot for receiving the latch tongue. The latch receiver includes a fixed wall having a recess for receiving the latch bead and a flexible wall biasing the bead into the slot.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 3 is a bottom view of the boot of FIG. 1;

FIG. 4 is a sectional view, taken along line 4—4 of FIG. 3, showing attachment of the boot to the vehicle body by front side fastening clips;

FIG. 5 is a plan view of the vehicle well opening;

FIG. 6 is a sectional view, taken along line 6—6 of FIG. 3, showing attachment of the boot to the vehicle body by rear side fastening clips;

FIG. 7 is a plan view of the rear side clip shown in FIG. 6, illustrating how the clip is cut to conform to the tapering wall in area "X" of the well opening of FIG. 5;

FIG. 8 is a sectional view, taken along line 8—8 of FIG. 3, showing attachment of the boot to the vehicle body by front and rear fastening clips;

FIG. 9 is an enlarged partial sectional view taken along line 9—9 of FIG. 8;

FIG. 10 is an enlarged detail view of a typical fastening clip mounting on the boot;

FIG. 11 is an enlarged perspective view of a molded clip assembly for attaching the boot to the front quarter of the well;

FIG. 12 is a perspective view of an uninstalled boot according to this invention, prior to clip installation and illustrating creases formed in the boot to enable folding for storage;

FIG. 13 is a sectional view, taken along line 13—13 of FIG. 12, enlarged to show the folding creases;

FIG. 14 is a sectional view, taken along line 13—13 of FIG. 12 and showing a clip mounting recess formed in the peripheral edge of the boot body;

FIG. 15 is a perspective view of a boot folded in accordance with this invention, ready for boot storage;

FIG. 16 is an exploded view of the front clip and latch arrangement for attaching the front edge of the boot to the vehicle rear seat back shown in FIG. 17; and FIG. 17 is a perspective view of a vehicle rear seat, with diagrammatic arrows illustrating attachment and removal of the boot.

DETAILED DESCRIPTION OF A PREFERRED EMBODIMENT

Figure 1:
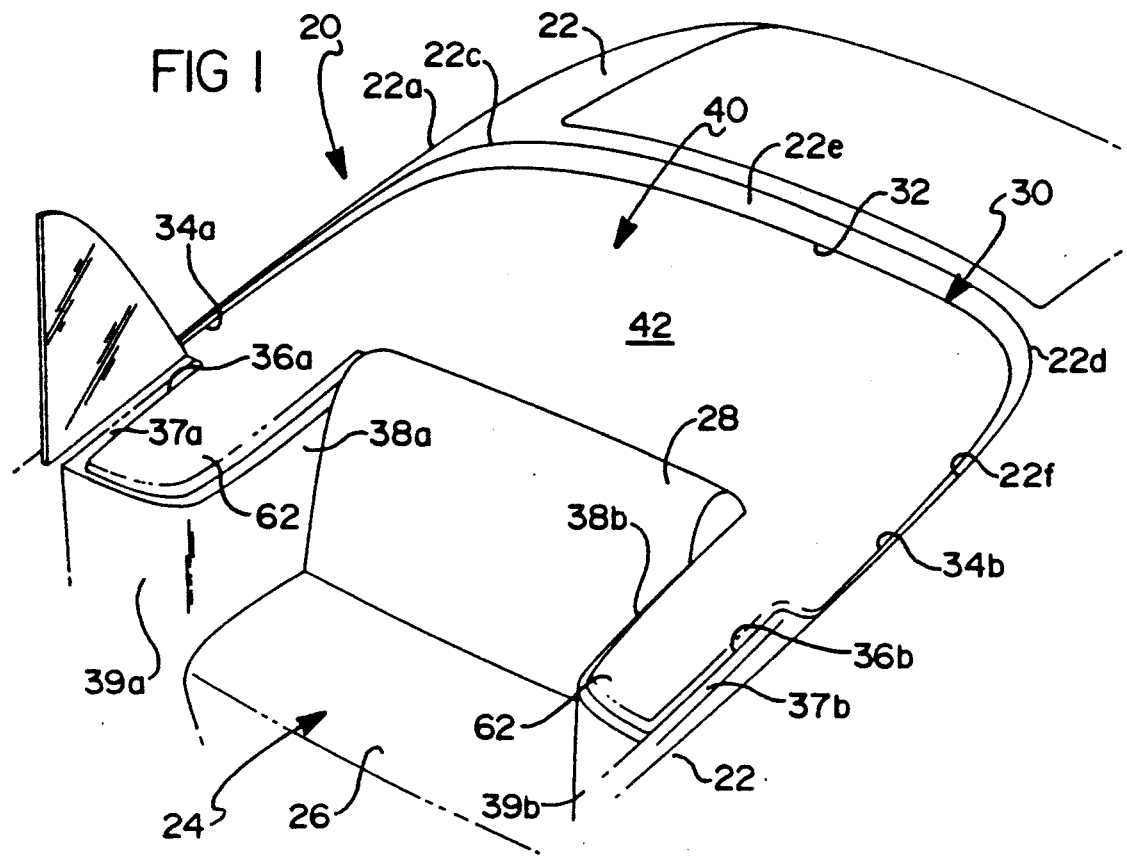
FIG. 1 is a partial perspective view of the rear of a convertible vehicle, with the top storage well covered by a boot according to this invention.

Referring now to FIG. 1, a convertible vehicle 20 comprises a body having exterior sheet metal 22. A passenger compartment 24 mounts a rear passenger seat 26 that has a seat back 28. Sheet metal 22 and seat back 28 bound an open-topped storage well 30 for storing the conventional convertible top (not shown).

Top storage well 30 has a symmetrical U-shape and is defined by a rear wall 32, side walls 34a and 34b, forwardly projecting U-shaped side quarter extensions 36a and 36b which are bounded by interior panels having side walls 37a, 37b and 38a, 38b and front walls 39a, 39b, and by seat back 28. A boot 40 according to this invention is provided to span and cover the top opening of well 30.

Referring now to FIGS. 2–9, boot 40 comprises a generally U-shaped body portion 42 and a plurality of fasteners, in the form of fastening clips, described later. As shown in FIG. 9, boot body portion 42 is a laminate preferably comprising a top layer 44 of expanded vinyl, an intermediate resin impregnated foam layer 46, a bottom backing layer 48 of flexible polyknit woven fabric, and intermediate thin scrims 49, 50 of fabric bounding foam layer 46, all bonded together. This bonded laminate provides a semi-rigid construction which is sufficiently rigid to be substantially self-sustaining over the expanse of the boot, while having sufficient ability to flex when stressed to facilitate installation and removal, as will later be described.

Figure 2:
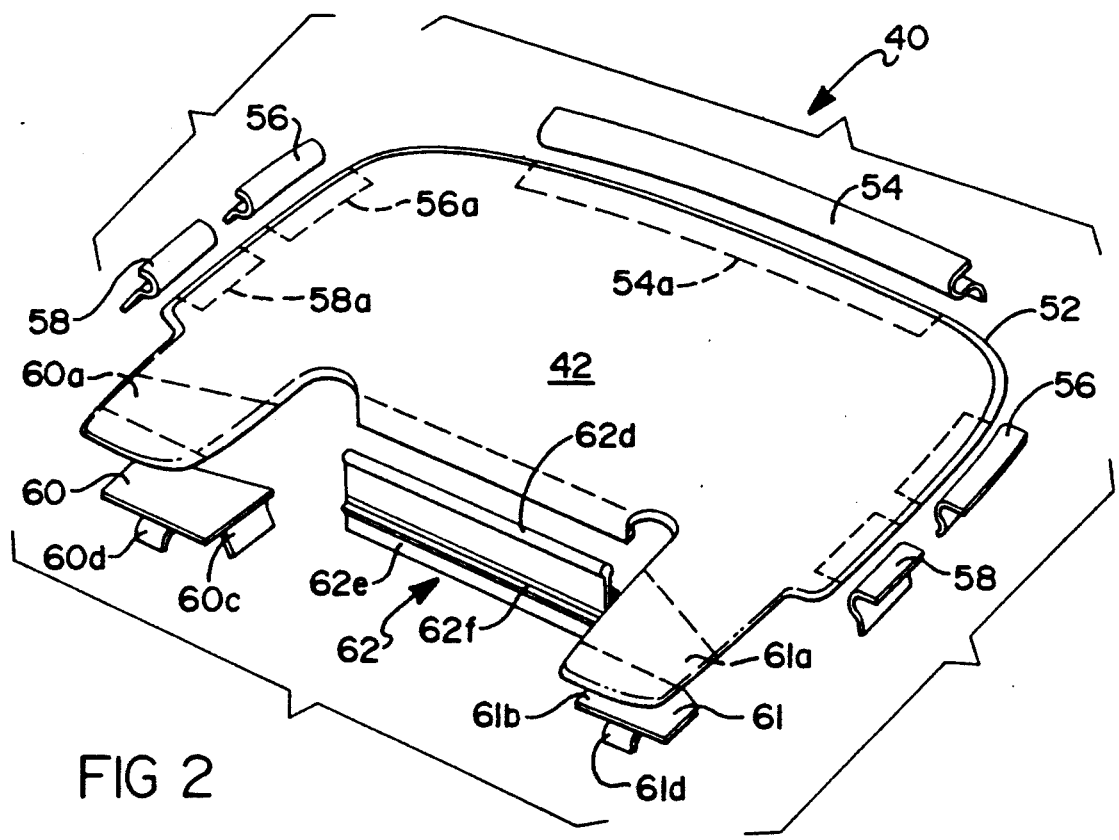
FIG. 2 is an exploded perspective view of the boot of FIG. 1, with the fastening clips shown disassembled.

Boot body portion 42 includes a peripheral edge 52 that is symmetrically indented on its underside to locate and mount fastening clips, as will now be described with reference to FIG. 2. Since body portion 42 is symmetrical, the left and right side fastening clips are identical. A rear fastening clip 54 is mounted in depression 54a along the rear extent of peripheral edge 52. Rear side clips 56 are mounted in depressions 56a and 56b, and front side clips 58 are mounted in depressions 58a and 58b. Molded quarter clip assemblies 60 and 61 extend the width of front quarter portions 60a and 61a, which are not indented, as will be later described.

The depressions 54a, 56a, 56b, 58a, and 58b have a depth and width which match the upper mounting flanges of mounting clips 54, 56 and 58, respectively. This relationship between the mounting clips and the mounting depressions is illustrated in FIGS. 10 and 14. Front side clip 58 includes an upper mounting flange 58c. Depression 58b has a depth d equal to the thickness of clip mounting flange 58c so that the clip does not protrude. This maintains the edge thickness of the boot the same at the clip and on either side of the clip. All clips and depressions are similarly configured so that the thickness of the peripheral edge 54 is constant. Thus, the depressions serve both to maintain a uniform edge thickness and also to accurately locate the clips on the boot body. The clips are secured to the boot body by a peripheral plastic welt 64 that is sewn with stitching 66 about boot periphery 52.

The configuration of all the clips are similar in that they all comprise a mounting flange and a C-shaped gripper portion. They differ in the exact configuration of the gripper portion which is tailored to accommodate the sheet metal configuration at the point of attachment. As shown in FIG. 4, clips 58 each comprise a mounting flange 58c, an intermediate gripper portion 58d and a depending leg portion 58e. Gripper portions 58d clamp the rolled body sheet metal bead 22a to secure the sides of boot 40 atop storage well 30. The depending leg portion 58e assists in boot installation, as will be later described.

FIG. 6 illustrates one of the rear side clips 56 as having a mounting flange 56c, a gripper portion 56d for clamping body panel bead 22c, and a curved lip 56e. FIG. 7 shows how clip 56 is cut along the edge of mounting flange 56c to create a tapered edge 56f that conforms to body panel rear side contour 22f in the area designated "X" in FIG. 5.

As mentioned above, clip assemblies 60 and 61 extend the width of, and are attached to front quarter portions 60a and 61a of body portion 42. FIG. 11 shows one of the clip assemblies 61 which is symmetrically identical to clip assemblies 60. Clip assemblies 61 is an injection molded part comprising a base plate 61b having clips 61c and 61d extending therefrom for engagement with the edges of side walls 38a and 38b and the edges of front walls 39a and 39b. Clips 61c and 61d are similar in shape to clips 56.

FIG. 8 shows the rear edge of boot body 42 mounting a rear clip 54 having a mounting flange 54c, a C-shaped gripper portion 54d for clamping sheet metal bead 22e, and a terminal elongated curved lip 54e. At its front edge, boot body 42 mounts front clip 62. As best shown in FIG. 16, front clip 62 includes a mounting flange 62c, an upstanding handle portion 62d, and a depending tongue 62e having a transverse latch bead 62f. A latch receiver 70 is mounted by screws 72 to vehicle body structure 74. Receiver 70 includes an upwardly open slot defined by opposed walls 70a and 70b. Wall 70b includes a transverse recess 70c for receiving latch bead 62f. Opposing wall 70a is flexible to admit tongue 62e and bead 62f into the receiver slot, where it is retained by the capture of bead 62f in recess 70c, where it is held by wall 70a.

One of the features of this invention is that boot 40 is constructed for ease of storage. While truly soft boots can be easily folded or rolled for storage in the vehicle trunk, they have drawbacks previously described. Truly hard boots cannot be folded and are difficult and bulky to store. Referring now to FIGS. 3, 12, 13 and 15, boot body 40 is formed with two underside integral grooves, or creases, which form fold lines 80, 82 and 84, which divide the boot into main portions 42a, 42b and 42c and front flap 42d. Boot 40 is prepared for storage by folding outer portions 42b and 42c upwardly and inwardly on fold lines 80 and 82 atop central portion 42a. The folded boot 40 can then be placed in a protective storage bag (not shown) and placed in the vehicle trunk.

Another feature of this invention is that the boot body is made slightly oversize, i.e. it is slightly longer and wider than well opening 30. This oversizing assures that boot 40 is always in slight compression when installed, to assure retention, even at high vehicle speeds. It has been found desirable to position the clips on boot body 42 to increase the fore/aft, or longitudinal spacing dimension of the boot preferably approximately 8 mm greater than the corresponding spacing of the front and rear edges which define well 30. Similarly, the boot body is increased approximately 19 mm greater than the cross car, or lateral dimension of well 30.

This spacing will accommodate current vehicle build variations and still assure that the boot body is in slight compression when installed. Boot compression is augmented by front boot flap 42d, which is molded at a 45° to boot body 42. When the boot is installed, flap 42d will be stressed to 90° to boot body 42, providing added fore-and-aft compressive forces. Boot compression will cause an imperceptible upward bulging of the boot when installed on the dimensionally smallest well which could be produced. This oversizing and semi-rigidity of the boot assures no sagging and maintenance of the desired aesthetic styling lines of the vehicle.

Installation of boot 40 atop well 30 will now be described with reference to FIG. 17. Upon removal from the storage bag, the resilience of boot body 42 will cause boot 40 to return from the folded condition of FIG. 15 to the flat condition of FIG. 3. The laminated construction of boot body 42 assures that it has an elastic memory sufficient for this to occur.

Boot 40 is first manually placed over storage well 30 by the installer. The installer then grasps front clip handle 62d and pushes tongue 62e into the slot between receiver walls 70a and 70b until latch bead 62f enters receiver recess 70c (A). The rear of the boot is pushed forward to arch the boot and rear clip 54 is installed (B). The sides are then concurrently (two installers) or sequentially (one installer) pushed inwardly sufficiently to enable installation of clips 56 and 58 (C). Lastly, front quarter portions 60 and 61 are concurrently or sequentially manipulates to install side clips 60c and 61c and front clips 60d and 61d (D).

The entire installation process is completed in 15-30 seconds, depending on whether one or two people install boot 40. When installed, the semi-rigid construction, coupled with the slight compression caused by slight oversizing, provides a smooth exterior appearance. The location and size of the clips, along with the slight compression, causes the boot to remain installed when the vehicle is driven.

Removal of boot 40 is much simpler and quicker than installation. It is a one-step process (E). The rear edge of boot 40 is pushed forward to free clip 54, and then grasped and pulled rearwardly. This causes boot 40 to literally "pop out" of well 30 and takes but 5 seconds. The flexibility of the attachment clips and the resilience of boot body 42 permits this simple, quick removal procedure.

Thus, this invention provides a boot which presents a smooth appearance despite the ambient temperature, yet which utilizes minimal space when stored, thus combining the features of both soft and hard boots. It also provides a boot which readily accommodates vehicle build dimensional variations without affecting the appearance of the boot when installed. With the boot of this invention, installation and removal are extremely simple and quick.

While only a preferred and an alternative embodiment have been illustrated and described, obvious modifications thereof are contemplated within the scope of this invention and the following claims.

We claim:

1. A boot for covering a vehicle storage well, which has an opening defined by front, rear and side edges, to conceal a convertible top stored therein, comprising a semi-rigid laminate of vinyl and foam layers having a vinyl top layer shaped to cover the well opening when installed, said boot having a smooth top surface and a plurality of grooves in its bottom surface dividing the boot laterally into a plurality of segments to facilitate folding of the boot along the grooves into a compact form for storage, a plurality of indentations of reduced thickness formed in the laminate at spaced locations on the boot bottom surface about its periphery, and a plurality of fasteners secured about the boot periphery in said indentations for engagement with the well edges to install the boot.

2. The boot of claim 1, wherein there are at least two bottom surface grooves spaced to divide the boot into segments to enable folding the boot into a compact form.

3. The boot of claim 1, wherein the fasteners comprise flexible clips for readily releasably engaging the well side and rear edges to enable quick removal of the boot.

4. The boot of claim 3, wherein the side and rear edge fasteners comprise clips having a mounting portion and a flexible finger for clampingly engaging the well side and rear edges to the mounting portion.

5. The boot of claim 4, wherein the combined thickness of the laminate at the indentation and of the clip mounting portion is the same as the thickness of the adjacent laminate to provide thickness continuity about the boot periphery.

6. A boot for covering a vehicle storage well, which has an opening defined by front, rear and side edges, to conceal a convertible top stored therein, comprising a semi-rigid laminate of vinyl and foam layers having a vinyl top layer shaped to cover the well opening when installed, and a plurality of flexible fasteners secured about the boot periphery for lateral engagement with the well side edges to install the boot, said fasteners being laterally spaced such that the boot is in lateral compression when installed, said boot and fasteners being sufficiently flexible to enable the fasteners to engage and be readily disengaged from the well edges.

7. The boot of claim 6, wherein the fasteners comprise clips which each engage and embrace the well side edges to retain the boot against vertical displacement when installed.

8. The boot of claim 7, wherein the thickness of the laminate is reduced at spaced locations on the boot bottom surface about its periphery providing indentations for locating and mounting the fasteners.

9. The boot of claim 7, wherein the side clips each have a mounting portion and a flexible finger for clampingly engaging the well side and rear edges to the mounting portion.

10. The boot of claim 9, including a latch device for fastening the front edge of the boot to the well wall, said latch device including a tongue mounted on the boot and a tongue receiver mounted on the well wall, the tongue having a handle for operating the latch to facilitate installation, said receiver being sufficiently flexible to enable the tongue to be readily disengaged during removal of the boot.

11. The boot of claim 10, wherein the boot has a longitudinal dimension slightly greater than the longitudinal spacing of the well front and rear edges and the latch device has sufficient rigidity to place the boot in longitudinal compression when installed.

12. The boot of claim 11, wherein the boot is approximately 19 mm larger laterally than the well opening.

13. The boot of claim 12, wherein the boot is approximately 8 mm larger longitudinally than the well opening.

14. The boot of claim 6, wherein the fasteners comprise clips which each engage and embrace the well side and rear edges to retain the boot against vertical displacement when installed.

15. The boot of claim 14, wherein there are at least two bottom surface grooves spaced to divide the boot into segments to enable folding the boot into a compact form.

16. The boot of claim 15, wherein the thickness of the laminate is reduced at spaced locations on the boot bottom surface about its periphery providing indentations for locating and mounting the clips.

17. The boot of claim 16, wherein the side and rear edge fasteners comprise clips each having a mounting portion and a flexible finger for clampingly engaging the well side and rear edges to the mounting portion.

18. The boot of claim 17, wherein the combined thickness of the laminate at the indentation and the clip mounting portion is the same as the thickness of the adjacent laminate to provide thickness continuity about the boot periphery.

19. The boot of claim 18, including a latch device for fastening the front edge of the boot to the well wall, said latch device including a tongue mounted on the boot and a tongue receiver mounted on the well wall, the tongue having a handle for operating the latch to facilitate installation, said receiver being sufficiently flexible to enable the tongue to be readily disengaged during removal of the boot.

20. The boot of claim 19, wherein the boot has a longitudinal dimension slightly greater than the longitudinal spacing of the well front and rear edges and the latch device has sufficient rigidity to place the boot in longitudinal compression when installed.

21. A boot for covering a vehicle storage well for concealing a convertible top stored therein, said well having an opening defined by rear and side edges and a passenger compartment rear wall defining the well front edge, comprising
    a semi-rigid body shaped to cover the well opening when installed,
    a plurality of fasteners secured about the boot periphery comprising clips which each engage and embrace the well side and rear edges,
    and a latch device for fastening the front edge of the boot to the well wall, said latch device having a handle to facilitate installation of the boot, said boot being sufficiently flexible to enable the clips to engage the well side and rear edges during installation of the boot and said clips being sufficiently flexible to readily disengage the well side and rear edges during removal of the boot.

22. The boot of claim 21, wherein the latch device has a handle at one end and comprises a tongue mounted on the boot and a protruding latch bead at the other end, and a latch receiver mounted on the well wall and including a slot for receiving the latch tongue and including a fixed wall having a recess for receiving the latch bead and a flexible wall biasing the bead into the slot.

23. The boot of claim 21, wherein the storage well is U-shaped, having a pair of forwardly-projecting side quarter portions each having front and spaced side walls, and the fasteners comprise
    quarter clips for engaging and embracing at least two of the quarter walls.

24. The boot of claim 21, wherein the boot has a lateral dimension slightly wider than the lateral spacing of the well side edges and a longitudinal dimension slightly larger than the longitudinal spacing of the well front and rear edges and the latch device has sufficient rigidity to place the boot in lateral and longitudinal compression when installed.

25. The boot of claim 24, wherein the side and rear clips each have a mounting portion and a flexible finger for clampingly engaging the well side and rear edges to the mounting portion.

26. The boot of claim 25, wherein the latch device comprises a tongue mounting the handle at one end and a protruding latch bead at the other end, and a latch receiver mounted on the well wall and including a slot for receiving the latch tongue and including a fixed wall having a recess for receiving the latch bead and a flexible wall biasing the bead into the slot.

27. The boot of claim 26, wherein the thickness of the laminate is reduced at spaced locations on the boot bottom surface about its periphery providing indentations for locating and mounting the clips and the latch tongue.

* * * * *